United States Patent [19]
Downing

[11] 3,920,260
[45] Nov. 18, 1975

[54] CART SHELF SUPPORTING STRUCTURE
[75] Inventor: Joe R. Downing, Caruthersville, Mo.
[73] Assignee: The Colson Company, Caruthersville, Mo.
[22] Filed: Feb. 12, 1975
[21] Appl. No.: 549,187

[52] U.S. Cl............. 280/79.3; 211/150; 280/47.35
[51] Int. Cl.² ........................................ B62D 53/06
[58] Field of Search............ 280/79.3, 79.2, 47.35, 280/33.99 R; 108/12, 14, 15, 16; 312/313, 315, 323; 211/150, 134

[56] References Cited
UNITED STATES PATENTS

| 672,921 | 4/1901 | Slingsby | 280/79.3 |
|---|---|---|---|
| 1,518,497 | 12/1924 | Flood | 280/79.3 |
| 2,256,592 | 9/1941 | Harper | 312/315 |
| 2,716,495 | 8/1955 | Prevette | 211/150 |
| 3,074,734 | 1/1963 | Munson | 280/47.35 |
| 3,542,220 | 11/1970 | Propst | 280/79.2 |

Primary Examiner—Robert R. Song
Attorney, Agent, or Firm—Wegner, Stellman, McCord, Wiles & Wood

[57] ABSTRACT

A cart having a wheeled base defining spaced uprights provided for adjustably supporting the shelf member on the uprights for selectively defining a horizontal support shelf and a vertical side retainer wall. The cart includes structure for slidably and pivotably mounting the shelf member to one or more of the uprights to effect the desired selective positioning.

10 Claims, 9 Drawing Figures

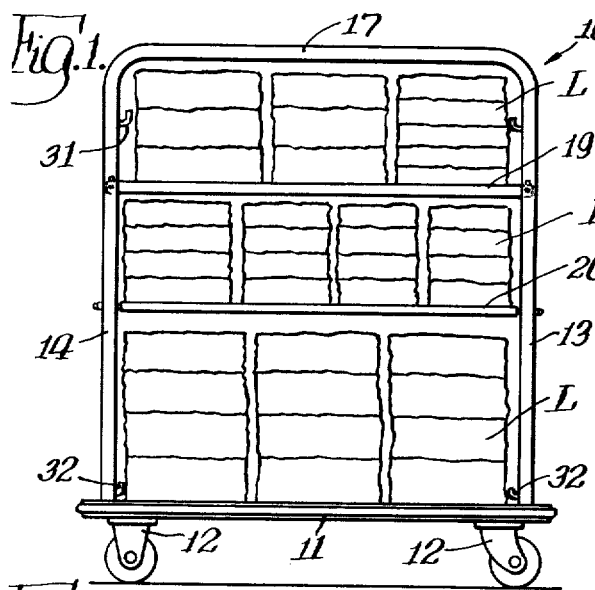
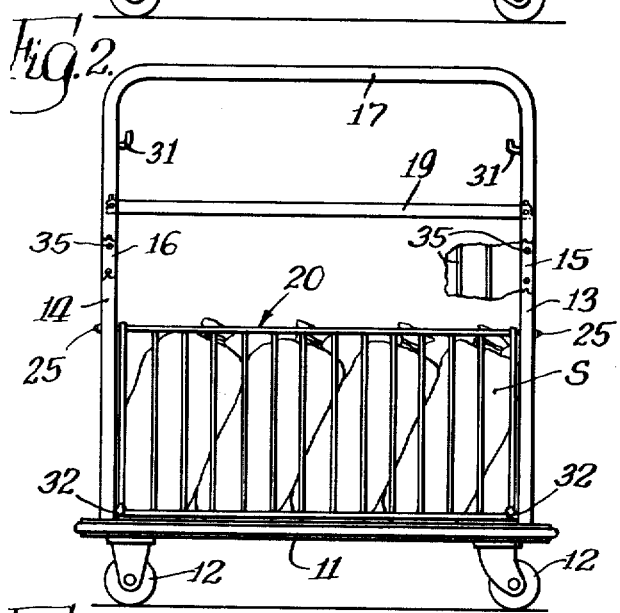
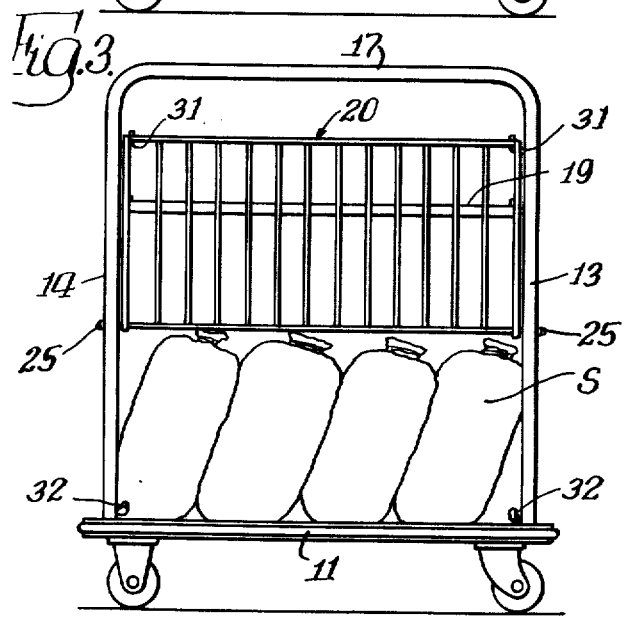
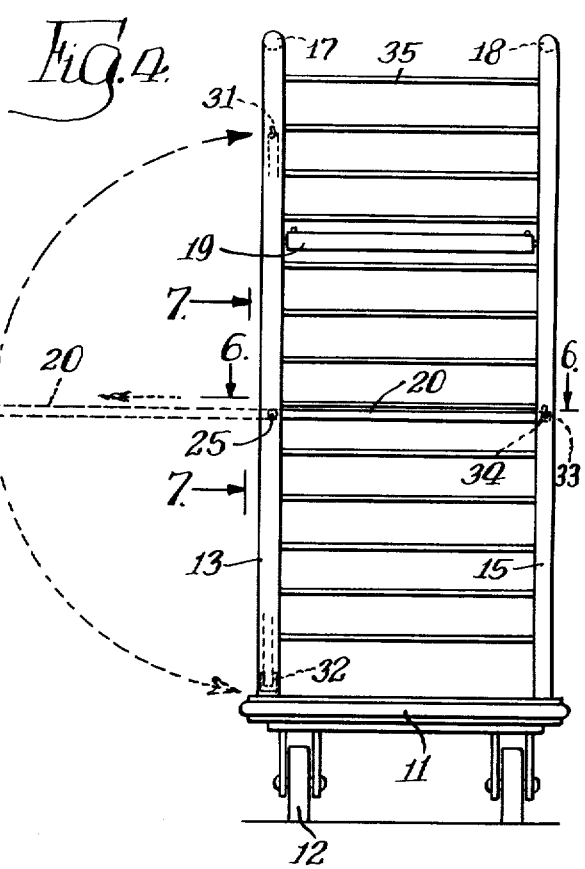
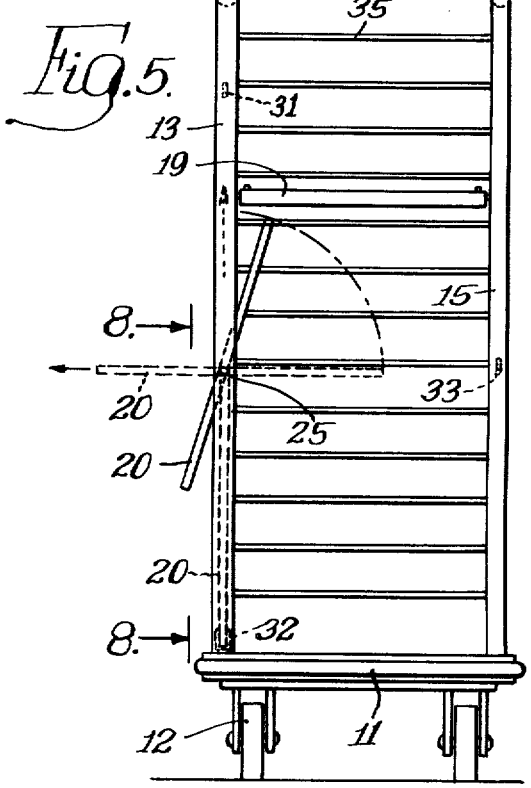

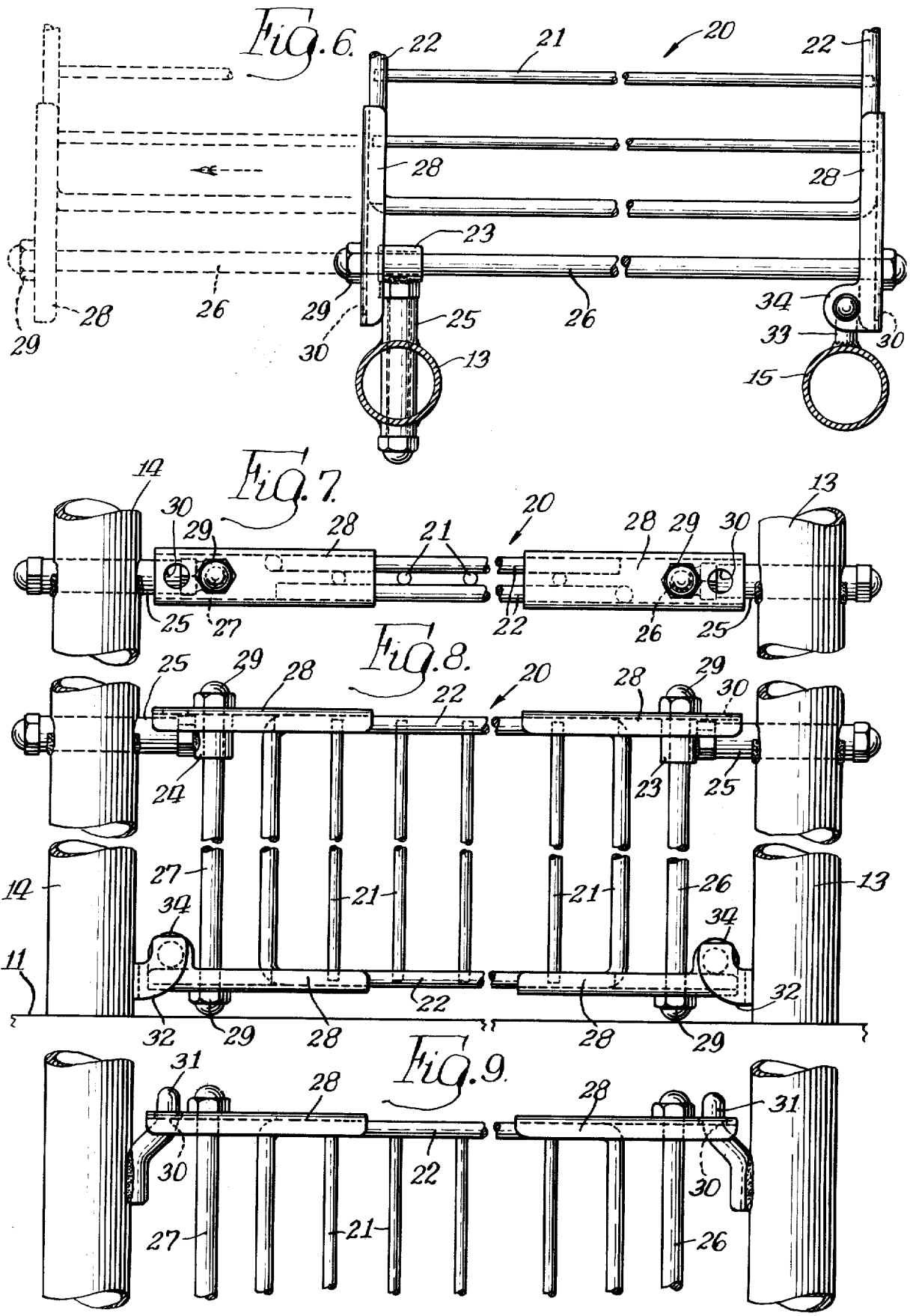

CART SHELF SUPPORTING STRUCTURE

BACKGROUND OF THE INVENTION

1. Field of the Invention

This invention relates to cart constructions, and in particular to cart shelf supporting structures.

2. Description of the Prior Art

In carts such as hospital laundry carts, it is desirable to provide different arrangements of the cart for selectively utilizing the cart such as for delivering stacked linen and returning bagged soiled linen. In using the cart for delivery of stacked fresh linen, it is desirable to provide a plurality of shelves on which the linen is carried for facilitated disposition. When the cart is used for returning bagged soiled linen, it is desirable to eliminate these shelves and arrange the cart to receive the relatively bulky bags of soiled linen collected from the different patients' rooms. As these bags are relatively heavy, it is further desirable to arrange the cart to permit the carrying of the bags on a lower, or base, portion of the cart, permitting facilitated placement of the bags on the cart and removal therefrom.

A number of hospital carts have been developed for such use, but heretofore, none of the carts have provided facilitated selective arrangement in the alternative dispositions and the known carts have been relatively expensive.

SUMMARY OF THE INVENTION

The present invention comprehends an improved cart shelf supporting structure for use in a cart having a wheeled base defining spaced uprights at the sides of the cart. The supporting structure is arranged to support a shelf member selectively for defining a horizontal support shelf or a vertical side retainer wall. More specifically, the invention comprehends such a shelf supporting structure including means defining slide supports, means defining elongated slides on the shelf member extending in a width direction of the shelf member and slidable one each through the slide supports, means for pivotally mounting the slide supports one each to the uprights at one side of the cart for pivoting about a horizontal axis perpendicular to the side-to-side direction of the cart whereby the shelf member may be pivoted about the axis and translated perpendicular to the axis, and means for retaining the shelf member selectively in a horizontal position across the cart from side-to-side thereof to define a horizontal support shelf across the cart, or in a vertical position at the one side of the cart to define a vertical retainer wall along the one side.

The retaining means may comprise means for retaining the shelf member in a plurality of vertical positions at one side of the cart, and more specifically, may selectively retain the shelf member in a first vertical position at the bottom of the cart for retaining objects in the cart against movement outwardly therefrom through the one side, and in a second vertical position spaced above the bottom of the cart for permitting movement of objects through the one side of the cart at the bottom thereof.

In the first position, the shelf member may extend downwardly from the slide supports, and in the second position, the shelf member may extend upwardly from the slide supports.

The slides on the shelf member may comprise end wires on the shelf member, and the slide supports may comprise elements defining a through opening slidably receiving the wires.

Thus, the shelf member may be selectively repositioned from the horizontal shelf support position to the vertical positions by a small movement outwardly and a subsequent swinging of the shelf member on the pivotally mounted slide supports with the shelf member being brought to the final vertical position by selectively sliding upwardly or downwardly therethrough.

The cooperative pivoting and sliding action of the shelf member support permits the repositioning of the shelf notwithstanding the disposition of additional shelves above or below the horizontal position of the adjustable shelf. Thus, for example, a fixed, stacked linen carrying shelf may be disposed a foot or so above the adjustable shelf horizontal position without preventing the selective repositioning of the adjustable shelf as discussed above.

Thus, the shelf supporting structure of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a side elevation of a cart having a shelf supporting structure embodying the invention with an adjustable shelf member thereof in a horizontal disposition for carrying stacked linen;

FIG. 2 is a side elevation thereof with the adjustable shelf member in a downwardly extending vertical position along one side of the cart for retaining bagged soiled linen in the lower portion of the cart;

FIG. 3 is a side elevation thereof with the adjustable shelf member in a raised vertical disposition along said side of the cart permitting removal of the bagged soiled linen from the lower portion of the cart;

FIG. 4 is an end view thereof illustrating in dotted lines one method of repositioning the shelf member;

FIG. 5 is an end view illustrating another method of repositioning the shelf member;

FIG. 6 is a fragmentary enlarged horizontal section taken substantially along the line 6—6 of FIG. 4;

FIG. 7 is a fragmentary vertical section taken substantially along the lines 7—7 of FIG. 4;

FIG. 8 is a fragmentary vertical section taken substantially along the line 8—8 of FIG. 5; and FIG. 9 is a fragmentary enlarged side elevation illustrating the means for retaining the adjustable shelf member in the raised vertical retainer wall disposition.

DESCRIPTION OF THE PREFERRED EMBODIMENT

In the exemplary embodiment of the invention as disclosed in the drawing, a cart 10 is shown to comprise a hospital laundry cart adapted to selectively carry stacked clean linen L and bagged soiled linen S.

The cart comprises a base 11 provided with suitable wheels 12, illustratively casters. The base is provided with uprights 13 and 14 at one side of the cart and 15 and 16 at the opposite side of the cart. Uprights 13 and 14 may be integrally joined by a horizontal top extension 17 and uprights 15 and 16 may be similarly integrally joined by horizontal top extension 18.

In the illustrated embodiment, the cart is provided with a fixed upper shelf 19 which extends from side-to-side across the width of the cart and from end-to-end the length of the cart, as shown in FIGS. 1 and 4. Shelf 19 may be disposed approximately one-fourth of the distance down from the top portions 17 and 18 to define an upper stacked linen supporting shelf, as illustrated in FIG. 1.

The invention further comprehends provision of a shelf member 20 which is selectively disposed in a horizontal support shelf disposition, as shown in FIGS. 1 and 4, to define a second stacked linen support shelf spaced below fixed shelf 19 at approximately one-half the distance downwardly from the top portions 17 and 18 to the base 11. As shown in FIG. 1, the base 11 defines a lowermost support for stacked linen so that, in this arrangement of the cart, the entire cart may be utilized for this purpose.

As best seen in FIG. 6, shelf member 20 has a width substantially equal to the width of the cart as defined by the spacing between uprights 13 and 15 at the opposite sides of the cart. The shelf member may comprise a grill shelf member formed of suitable rigid transverse wires 21 and longitudinal wires 22. The shelf member is adjustably supported on the uprights by means of a slide support 23 on upright 13 and a similar slide support 24 on upright 14. The slide supports are pivotally mounted to the respective uprights by pivot carriers 25 which permit the slide supports to rotate about a common horizontal axis. The shelf member is provided at its opposite ends with transverse slides 26 and 27, respectively, slidably received in the slide supports 23 and 24. The slides 26 and 27 may be secured to the shelf member 20 by suitable clips 28 which are clamped to the opposite ends of the longitudinal end wires 22 by suitable cap nuts 29 threaded to the opposite end of the slides 26 and 27. Clips 28 further define apertures 30 at their outer ends.

As shown in FIG. 2, the uprights 13 and 14 are provided adjacent their upper ends with inwardly projecting L-shaped hooks 31 and adjacent their lower ends with L-shaped bifurcated brackets 32. Uprights 15 and 16 are provided at their mid-portion with similar L-shaped hooks 33.

As shown in FIGS. 4, 6 and 8, the clips 28 on the righthand edge portion of the shelf member 20 are provided with eye elements 34 which are adapted to receive the L-shaped hooks 33 on the uprights 15 and 16 to support the shelf member in the horizontal support shelf disposition of FIGS. 1 and 4.

When it is desired to reposition the shelf member 20, the eye elements are displaced from the hooks 33 by slightly raising the righthand edge of the shelf member and the shelf member is moved to the left, as seen in FIG. 4. If it is desired to dispose the shelf member in the bag holding disposition of FIG. 2, the shelf member is allowed to pivot downwardly from the pivot supports 23 and 24, as shown in FIG. 8. The shelf member is secured in the downwardly extending disposition of FIG. 2 against swinging on pivot carriers 25 by the reception of the clips 28 between the arms of the bifurcated brackets 32. Thus, the shelf member, in the arrangement of FIG. 2, defines a retaining wall positively effectively locked in the vertical position for retaining the bagged dirty linen S in the lower portion of the cart.

When access to the bagged linen is desired, the shelf member 20 is raised to the upper position of FIG. 3 by simply sliding the slides 26 and 27 upwardly through the slide supports 23 and 24. The shelf member is retained in the upper position by the projection of the L-shaped hooks 31 in the openings 30 of the clips 28, as shown in FIGS. 3 and 9, permitting facilitated removal of the bagged linen S from the base 11.

As shown in FIG. 5, the shelf member 20 may be swung on the pivot members to clear the upper shelf 19 notwithstanding the fact that the width of the shelf member 20 may be greater than the vertical spacing between the upper shelf 19 and the horizontal position of the shelf member 20 in the shelf support arrangement thereof, as shown in FIG. 4. Thus, the selective positioning of shelf member 20 may be effected with only minimal extension of the shelf member to the left of the cart, as seen in FIGS. 4 and 5, thereby minimizing the need for clearance space adjacent the cart in such repositioning.

In each of the selective positions of the shelf member, the shelf member is positively retained while yet the shelf member may be quickly and easily repositioned as discussed above.

The ends of the cart and the right side may be suitably closed with conventional fixed wires 35.

The shelf-supporting structure of the present invention is extremely simple and economical of construction while yet providing the improved functioning discussed above.

The foregoing disclosure of specific embodiments is illustrative of the broad inventive concepts comprehended by the invention.

I claim:

1. In a cart having a wheeled base defining spaced uprights at the sides of the cart, and a shelf member, structure for adjustably supporting the shelf member on said uprights for selectively defining a horizontal support shelf and a vertical side retainer wall comprising:

means defining slide supports;

means defining elongated slides on the shelf member extending in a width direction of the shelf member and slidable one each through said slide supports;

means for pivotally mounting said slide supports one each to the uprights at one side of the cart for pivoting about a horizontal axis perpendicular to the side-to-side direction of the cart whereby the shelf member may be pivoted about said axis and translated perpendicular to said axis; and means for retaining the shelf member selectively in a horizontal position across the cart from side-to-side thereof to define a horizontal support shelf across the cart, or in a vertical position at said one side of the cart to define a vertical retainer wall along said one side.

2. The cart shelf supporting structure of claim 1 wherein said retaining means comprises means for retaining the shelf member in a plurality of vertical positions at said one side of the cart.

3. The cart shelf supporting structure of claim 1 wherein said retaining means comprises means for retaining the shelf member in a first vertical position at the bottom of the cart for retaining objects in the cart against movement outwardly therefrom through said one side, and in a second vertical position spaced above the bottom of the cart for permitting movement of objects through said one side of the cart at said bottom thereof.

4. The cart shelf supporting structure of claim 1 wherein said retaining means comprises means for retaining the shelf member in a first position extending downwardly from said slide supports and in a second position extending upwardly from said slide supports.

5. The cart shelf supporting structure of claim 1 wherein said uprights at said one side of the cart are disposed at the front and rear ends of the cart, respectively, said shelf member extending substantially from side-to-side and from end to end of the cart in said horizontal support shelf disposition.

6. The cart shelf supporting structure of claim 1 wherein said shelf member has a width approximately one-half the height of said uprights.

7. The cart shelf supporting structure of claim 1 wherein said retaining means comprises means for retaining the shelf member in a first vertical position at the bottom of the cart for retaining objects in the cart against movement outwardly therefrom through said one side, and in a second vertical position spaced above the bottom of the cart for permitting movement of objects through said one side of the cart at said bottom thereof, said retaining means including a bracket on one side portion of said shelf member and cooperating retaining elements at bottom and top portions of said uprights at said one side of the cart adapted to retain the shelf member in a vertical position against pivoting about said axis when the shelf member is disposed in either of said first or second vertical positions.

8. The cart shelf supporting structure of claim 1 wherein said slides comprise end wires on said shelf member extending substantially from side edge to side edge thereof.

9. The cart shelf supporting structure of claim 1 wherein said slide supports comprise means defining a through opening slidably receiving said elongated slides.

10. The cart shelf supporting structure of claim 1 wherein said retaining means include support members carried on the uprights at the opposite side of the cart for supporting the shelf member removably in the horizontal support shelf disposition.

* * * * *